G. T. GREELEY.
RESILIENT SHOCK ABSORBING HUB UNIT.
APPLICATION FILED MAR. 19, 1917.
1,241,109.
Patented Sept. 25, 1917.
3 SHEETS—SHEET 1.
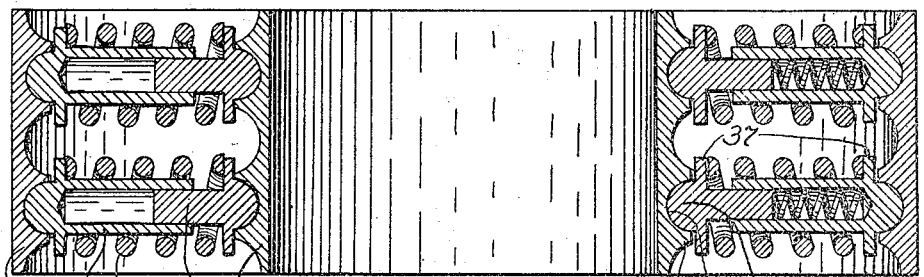
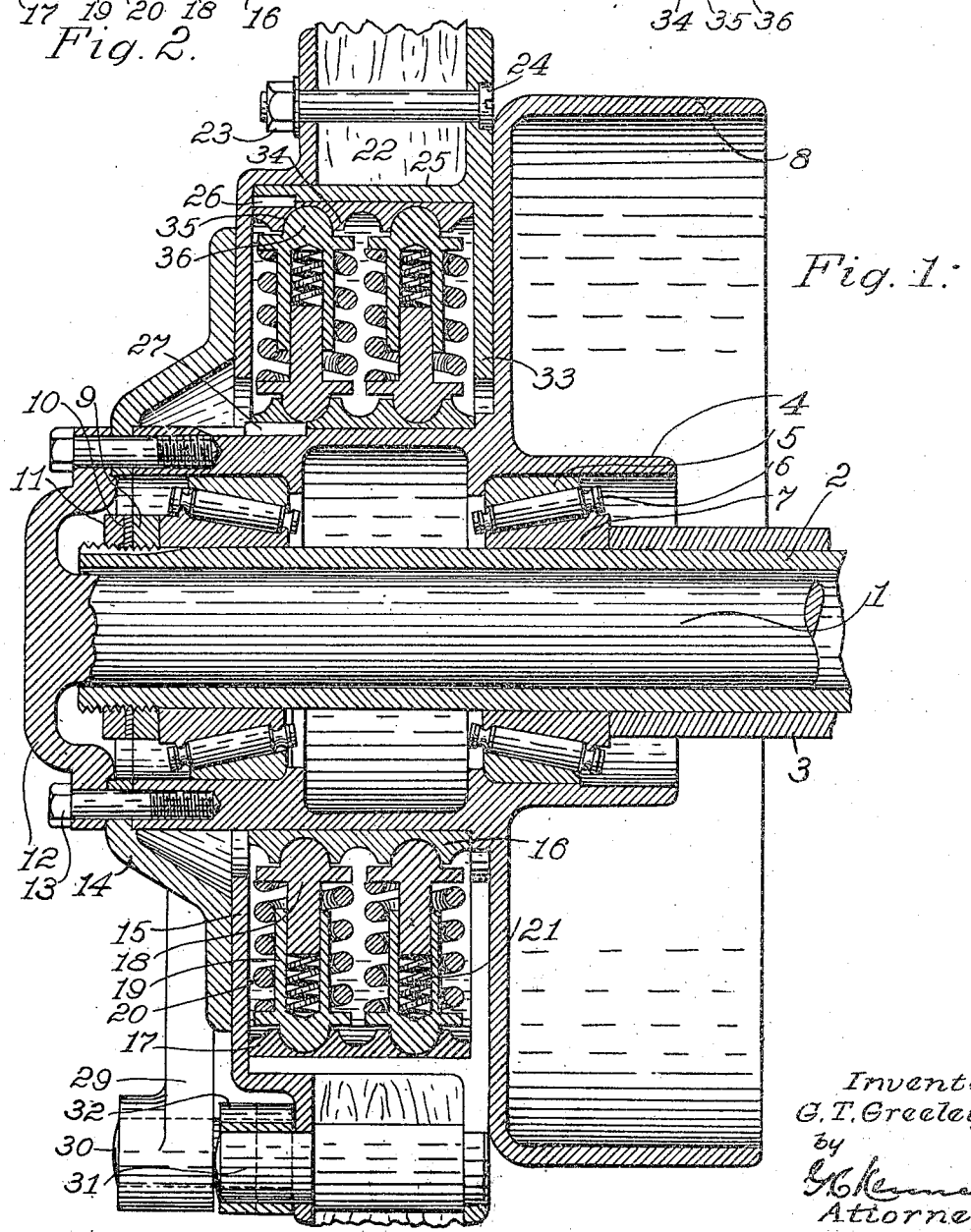

Inventor,
G. T. Greeley, by
G. C. Kennedy,
Attorney.

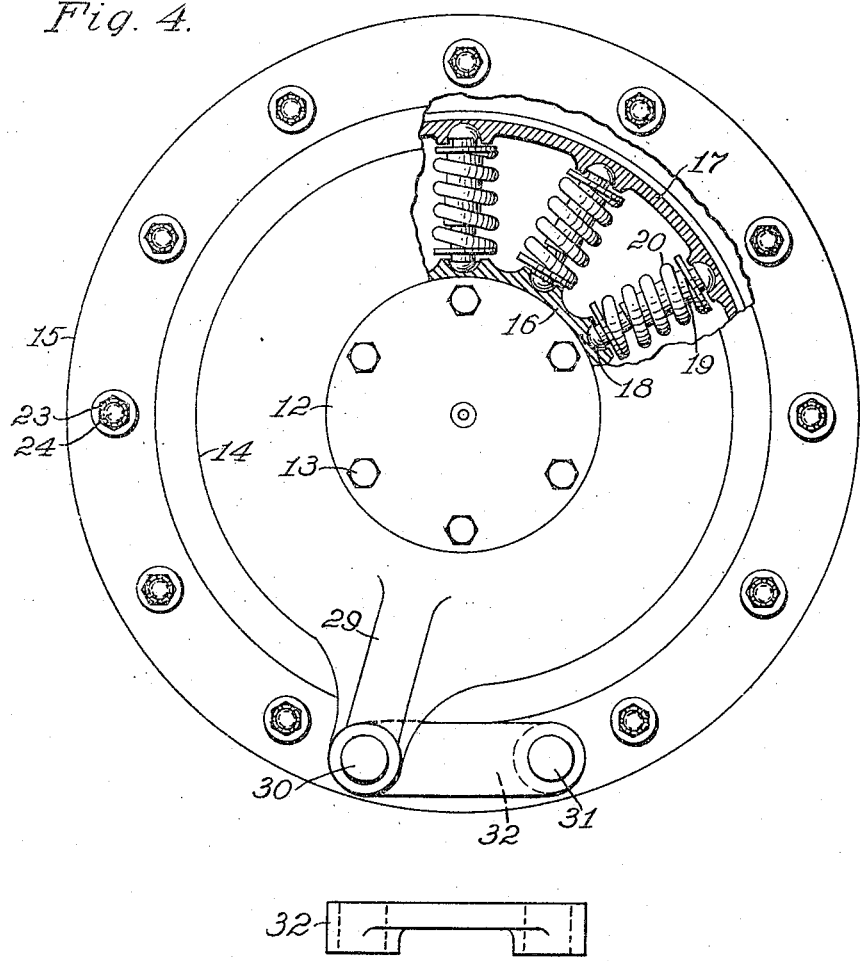

UNITED STATES PATENT OFFICE.

GEORGE T. GREELEY, OF CHICAGO, ILLINOIS.

RESILIENT SHOCK-ABSORBING HUB UNIT.

1,241,109.

Specification of Letters Patent.　Patented Sept. 25, 1917.

Application filed March 19, 1917. Serial No. 155,792.

*To all whom it may concern:*

Be it known that I, GEORGE T. GREELEY, a citizen of the United States of America, and a resident of Chicago, Cook county, Illinois, have invented certain new and useful Improvements in Resilient Shock-Absorbing Hub Units, of which the following is a specification.

My invention relates to improvements in resilient shock-absorbing hubs, and the object of my improvement is to supply an interchangeable hub which comprises coacting resiliently mounted elements and interchangeable anti-friction means adapted for use on a vehicle wheel or other wheel where it is desirable to prevent the communication of peripherally received shocks to the axial body on which the wheel and hub is mounted.

Figure 3:
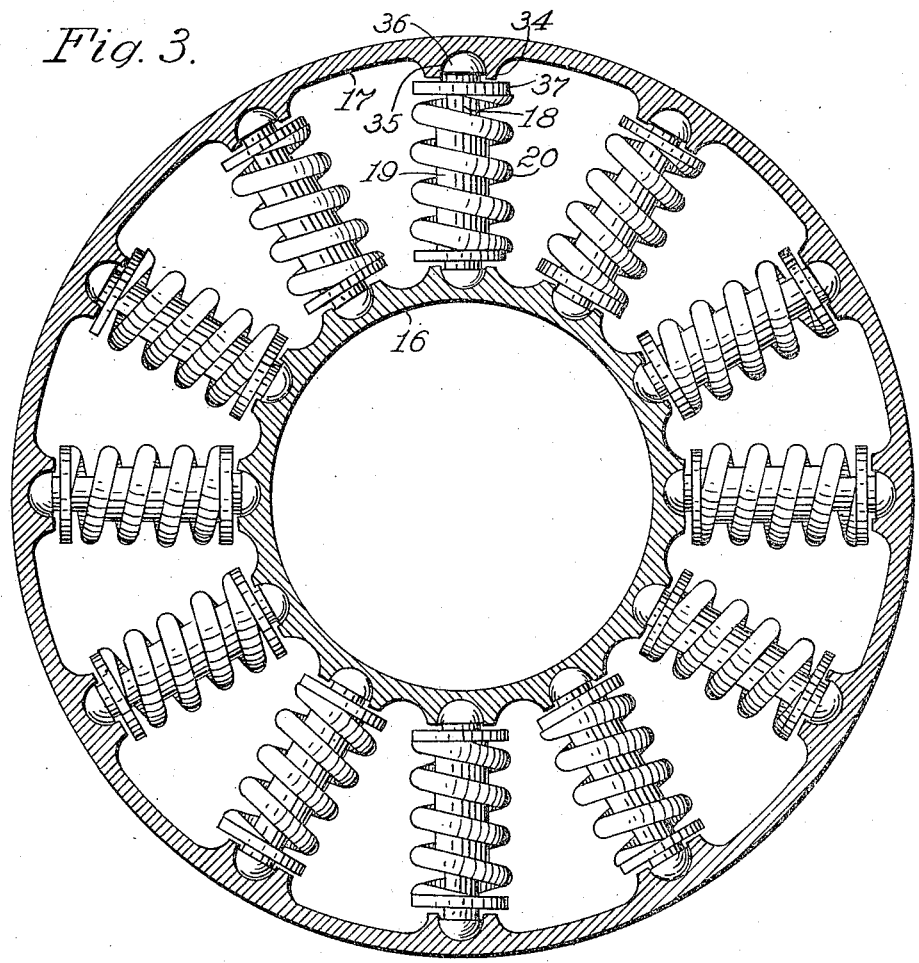
Figure 6:
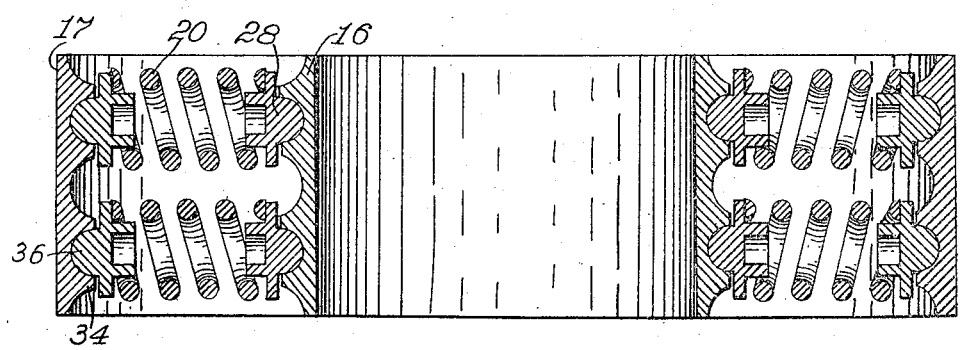

This object I have accomplished by the means which are hereinafter described and claimed, and which are illustrated in the accompanying drawings, in which Figure 1 is a central axial section of my improved shock-absorbing hub; Fig. 2 is a like section through the concentric spring-containing rings only of said hub; Fig. 3 is a transverse section of said spring-containing rings showing the radially disposed springs mounted between them; Fig. 4 is an elevation of the outer end of said hub with parts broken away; Fig. 5 is a detail view of a link-connection of said hub, and Fig. 6 is a like section to that of said Fig. 2, but showing a modified type of spring mountings positioned therein.

Similar numerals of reference denote corresponding parts throughout the several views.

Referring to Fig. 1, the numeral 2 denotes one end of a relatively fixed tubular housing. 1 is one end of an axle rotatably mounted in said housing. Upon said housing is fitted a sleeve 3 which extends only part way toward the end thereof, and on that part of the housing not so covered are mounted the like spaced sleeves 7 having inclined bearing surfaces or runways for the anti-friction rollers 6, but reversed in relative positions. The end of said housing 2 has exterior threads on which are mounted nuts 9 and 11 and an intermediate washer 10 abutting upon the outer end of the outer sleeve 7. Runway inclosing rings 5 are mounted between the rollers 6 and the concentric hub 4. The hub 4 has an integral friction rim 8 to form part of a friction-brake device. Upon said hub, a ring 16 is secured by means of a key 27. A disk 33 is positioned concentrically about the hub 4 in contact with the outer face of the web of the friction-rim 8, spaced from said hub, and has an outwardly extending rim part 25 spaced concentrically from the hub and containing a ring 17 secured thereto by means of a key 26.

The rings 16 and 17 have opposed bosses 34, which latter have hemispherical socket-bearings 35 to movably receive the hemispherical outer ends 36 of telescoping spacing-elements 18 and 19. Coiled compression springs 20 are mounted about said telescoping members 18 and 19, engaging integral annuli 37 thereon.

The numeral 15 denotes a face-plate mounted over the rim part 25, and has a depressed annular flange between which and the said disk are positioned the inner ends of spokes 22, these parts having alined orifices to receive bolts 24 fastened by nuts 23.

The axle 1 has an integral disciform extremity 12. A raised annular center disk 14 bears against the outer end of the hub 4, being positioned between the hub and the disk 12, said parts being secured together by means of machine-screws 13. The disk 14 has an orificed radial arm 29. A pivot-pin 31 is mounted fixedly in the flange of the face-plate 15, another pivot-pin 30 is secured in the orifice of said arm 29, and a link 32 is used to pivotally connect the pins 30 and 31, thus establishing a driving-connection between the driving axle 1—12 and the wheel-spokes 22.

It will be observed that the parts of my device are readily demountable, and as quickly re-assembled, for removal of the face-plate 15 permits insertion of the spring-carrying rings 16 and 17, while it is only necessary to remove the disk-plate 14, after the axle 1 has been displaced upon the removal of the screws 13, to allow placing or removal of the anti-friction elements 6 and 7 of the hub bearing. On this account, repairs are readily effected, substitutions of parts made, and it is made possible to employ standardized anti-friction bearings as well as standardized resilient connections for the relatively movable elements of the hub.

I have shown in Fig. 6 a modified form of spring-mounting of a simpler type, the anti-friction supporting bodies 28 for the ends of the springs 20 answering for the telescopic members 18 and 19 shown in said Fig. 2, and being cheaper as well as interchangeable, but it is evident that other forms of resilient connections and supporting means therefor may be used without departing from the principle of my invention.

Having described my invention, what I claim as new, and desire to secure by Letters Patent, is:

1. The combination with an axle having an enlarged outer end, a fixed housing about the axle, a hub rotatably mounted on said housing and secured detachably to the enlarged end of said axle, said hub having an integral annular flange, an annular web positioned coaxially about and spaced from said hub in contact with said annular flange, said web having an annular rim coaxial with the hub and spaced therefrom, spaced annular cylindrical rings positioned between said hub and said annular rim and keyed thereto respectively to permit relative longitudinal displacement only of the rings, an annular face-plate detachably secured to said web and centrally offset to cover the interspace of said hub and annular rim, radially disposed resilient elements engaged between said hub and annular rim, and separable relatively movable connecting means between said axle, said hub and said web.

2. In combination, an axle, a fixed housing about the axle, a hub rotatably mounted on said housing and having an integral annular flange, an annular web positioned about and spaced from said hub in contact with said annular flange and having an annular spoke-carrying rim, a plurality of yieldable resilient bodies mounted between said hub and said annular rim, an annular face-plate detachably secured to said web and covering the interspace of said annular rim and said hub, an annular plate detachably secured to the outer end of said hub, contacting with the outer face of said face-plate, means for detachably securing said annular plate to said axle, and separable relatively movable connecting means between said web, said hub and said axle.

3. In combination, a relatively fixed tubular housing, an axle rotatably mounted within the housing, and having its outer end projecting therefrom, a hub rotatably mounted upon the housing, an annular rim positioned coaxially about and spaced from said hub, separable relatively movable connecting means between said rim, said hub and the said projecting part of said axle, and yieldable resilient elements engaged between said hub and said rim.

4. In combination, a relatively fixed tubular housing, an axle rotatably mounted within the housing, and having its outer end projecting therefrom, a hub rotatably mounted upon the housing, an annular rim positioned coaxially about and spaced from said hub, separable relatively movable connecting means between said rim, said hub and the said projecting part of said axle, yieldable resilient means positioned between said rim and said hub, means connected to said hub for closing the opposite ends of the interspace of said rim and hub, and means connected to said housing for preventing longitudinal displacement of said rim relative to said hub.

5. In combination, a relatively fixed tubular housing, an axle rotatably mounted within the housing, a hub rotatably non-slidably mounted upon the housing, an annular rim positioned about said hub and movable only radially from said hub, elastic supporting means mounted between said hub and rim, and connecting-means between said rim, hub and axle permitting said radial displacement only of the rim relative to the hub and axle.

Signed at Amarillo, Texas, this 12th day of March 1917.

GEORGE T. GREELEY.

Copies of this patent may be obtained for five cents each, by addressing the "Commissioner of Patents, Washington, D. C."